United States Patent

[11] 3,576,388

| [72] | Inventor | Carl Newton Bruns<br>Adrian, Mich. |
|---|---|---|
| [21] | Appl. No. | 781,309 |
| [22] | Filed | Dec. 5, 1968 |
| [45] | Patented | Apr. 27, 1971 |
| [73] | Assignee | Stauffer-Wacker Silicone Corporation |

[54] ELECTRICAL CABLE
7 Claims, 2 Drawing Figs.

[52] U.S. Cl. .................................................. 174/116,
174/110, 174/113
[51] Int. Cl. ..................................................... H01b 7/02
[50] Field of Search........................................... 174/116,
110.7, 110.3, 110.8, 121.3, 121.4; 161/(Digests);
174/110, 113, 116, 124, 121

[56] References Cited
UNITED STATES PATENTS

| 2,186,793 | 1/1940 | Woptke...................... | 174/116X |
| 2,800,524 | 7/1957 | Van Lear...................... | 174/116 |
| 3,030,215 | 4/1962 | Veatch...................... | 161/Microballons |

FOREIGN PATENTS 1,098,131  1/1968  Great Britain................  174/110.7

OTHER REFERENCES

G. E. Silicones Selector Guide, p. 6, Jan. 1968 (Copy in 174-110.7)

Insulation, Directory/Encyclopedia June/July 68 p. 207—208

*Primary Examiner*—Lewis H. Myers
*Assistant Examiner*—A. T. Grimley
*Attorney*—Marion D. Ford ABSTRACT: The invention relates to a multiple-conductor electrical cable containing a heat-curable cellular or noncellular silicone rubber as valley sealant between the individual conductors. The cellular heat-curable silicone rubber may be foamed in situ prior to curing to form an elastomeric material which will reduce the density of the electrical cable. Should the cable be exposed to an open flame, the cellular or noncellular silicone rubber will revert to a nonconductive inert organic silica layer and thereby protect the electrical integrity of the cable.

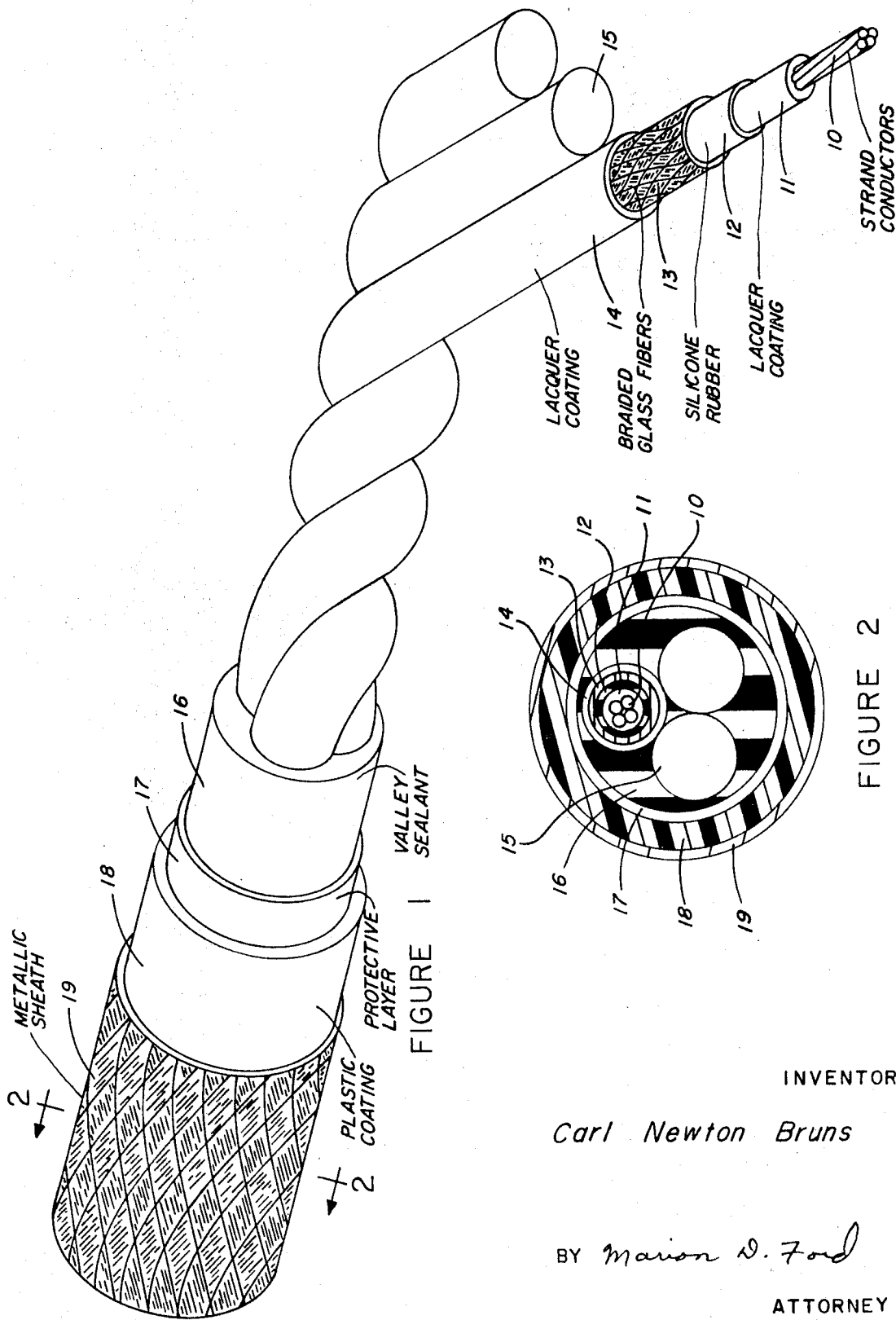

ELECTRICAL CABLE

This invention relates to an electrical cable, particularly to an insulated electrical cable and more particularly to an insulated electrical cable which contains a cellular or noncellular heat-curable silicone rubber as a valley sealant.

Heretofore, various organic polymers and adhesive-type materials were used as valley sealants in electrical cables containing a multiplicity of conductors to prevent moisture wicking at the wire ends. Even though these valley sealants prevented moisture wicking, they were extremely difficult to remove when the cables were spliced. In addition, exposure of the cables to an open flame frequently resulted in consumption of the valley sealant and destruction of the circuit integrity. Although several types of valley sealants have been used by the industry, many of these sealants will not maintain circuit integrity when subjected to an open flame environment, and at the same time afford ease of stripping out the sealant when terminating.

Therefore, it is an object of this invention to provide a new and improved electrical cable containing a multiplicity of conductors. Another object of this invention is to provide an electrical cable which is free of moisture wicking. Still another object of this invention is to provide an electrical cable which will maintain circuit integrity when exposed to an open flame. A further object of this invention is to provide an electrical cable which may be easily stripped for splicing.

The foregoing objects and advantages which will become apparent from the following description are accomplished in accordance with this invention, generally speaking, by providing an electrical cable containing a heat-curable silicone rubber as a valley sealant. In addition, the silicone rubber may be filled with low density cellular particulate matter or may be foamed in situ to form a cellular elastomeric material which will revert to a nonconductive, inert inorganic silica ash when exposed to an open flame. The silica ash will protect the circuit integrity of the cable even in the advent of a long duration open flame environment.

This invention will be better understood by the following description and reference to the accompanying drawing wherein:

FIG. 1 is a front elevational view of an electrical cable of this invention with successive layers cut away to show the structures;

FIG. 2 is a cross-sectional view of the electrical cable of this invention.

Referring to FIGS. 1 and 2, the electrical cable includes a strand or multiple-strand conductor 10, preferably of a copper-stranded material; although it is to be understood that silver and other metallic conductors may also be utilized singly or in combination with other materials. A paste coating 11 may be applied to strand conductor 10 as a sealant and directly over the paste coating is applied a silicone rubber layer 12. In the preferred embodiment, methyl silicone rubber is used; although it is to be understood that other silicone rubbers, such as ethyl, vinyl, phenyl silicone rubber and fluorosilicone rubber, as well as other types of silicone rubber may also be utilized. The silicone rubber may be extruded or applied as a tape or film, or as part of a silicone rubber glass tape or polyester fiber silicone rubber tape or film. In the preferred embodiment, an extruded silicone rubber layer is used because of its ease of fabrication.

In a preferred embodiment, the silicone rubber layer 12 is covered with braided or woven glass fibers 13 which are fabricated in accordance with conventional braiding methods from a plurality of filamentary strands or ribbon-like members. Each of the filamentary strands or members is extremely thin and is characterized by a high degree of flexibility which is particularly advantageous in coiled cables. Moreover, the individual filamentary strands forming the braid and crossing each other repeatedly do not develop or sustain any inductive effect as would be the case with conventional metallic coatings. Other braided or woven materials which may be used are cotton, rayon, and other synthetic fibers or combinations thereof.

Where desired, a lacquer layer 14 is applied to the braided glass fibers 13 in order to seal and prevent unraveling of the braided fibers. The coated strand conductors 15 thus formed are hereinafter referred to as "single" conductors.

In fabricating the electrical cable, two or more single conductors 15 may be wound in a spiral fashion about each other to provide a compact electrical cable containing a multiplicity of conductors. An organopolysiloxane rubber composition, preferably a heat-curable organopolysiloxane composition, is applied as a valley sealant 16 during the cabling of the single conductors 15 to form a layer of insulation around and between the adjacent single conductors. If desired, the organopolysiloxane composition may include a blowing agent which will form a cellular elastomeric material when cured.

A protective layer 17 formed from a flexible material may be applied over the organopolysiloxane valley sealant 16 to provide physical and electrical protection generally necessary to meet environmental conditions and to hold the valley sealant in place. The layer 17 must be sufficiently thin to preclude substantial diameter buildup in the electrical cable and must be sufficiently strong to withstand the tensile stress imparted thereto during normal use. Materials which satisfy these requirements and which can be satisfactorily utilized as a protective layer are polyethylene terephthalate, polytetrafluoroethylene, polyfluorotrifluoroethylene, polyesters, cellophane, cellulose acetate, and the like.

A flexible protective layer 18 may be extruded over layer 17 to provide additional protection where extreme environmental conditions are encountered. Generally, an extruded elastomeric or plastic-type material is employed which will impart flame resistance and also provide a unitary continuous coating to the cable. This will prevent moisture wicking through overlapping layers of coating 17 into the interior of the cable. Where coating 18 is made from an elastomeric material, its flame resistance may be substantially improved by the addition of suitable flame-resistant materials. Examples of suitable elastomeric or plastic materials are polyvinylchloride, polyethylene, urethane, neoprene, nitrile rubber compounds, and silicone rubber.

The electrical cable is covered on its outer surface with a braided metallic sheath 19 to protect it against abrasion. The braided metallic cover may be formed from approximately 12 to 16 strands or strips of metal and braided over the protective coating 18. The metal sheath maintains cable integrity and protects the cable against abrasion or other environmental influence. Examples of suitable metals used in making the sheath 19 are nickel, aluminum, lead, brass, and alloys thereof.

The organopolysiloxane composition used as sealant 16 may include low density cellular particulate matter to minimize conductive and convective heat transfer and also to reduce the weight of the total composition. Where it is desirable to form a cellular elastomer, a blowing agent may be added to the curable organopolysiloxane composition. Other additives, such as pigments, flame retardants, and the like may be incorporated therein to impart desirable properties to the valley sealant.

The compositions of this invention may include an organopolysiloxane polymer, an antistructure agent, filler, and catalyst, where desired, and may be characterized as having a typical penetrometer value between 250 and 350, preferably between 280 and 325 (expressed in units of tenths of millimeters), after 10 seconds at 25° C. as determined in accordance with ASTM D 217–65T.

The organopolysiloxane polymer has an apparent viscosity above about 100,000 centistokes, preferably between 100,000 and 750,000 and more preferably between 250,000 and 400,000 centistokes. The organic substituents on the polysiloxane are lower alkyl, lower alkenyl, and aryl radicals which are present in an average amount between 1.75 and 2.25 organic radicals per silicon atom with at least 50 percent in number of the substituents being methyl groups and the remainder of the groups being methyl or methyl with 5 to 20 percent phenyl or methyl with phenyl and vinyl or methyl vinyl or cyanopropyl groups, methyl vinyl and ethyl groups or methyl and trifluoropropyl groups. The polymer may be further illustrated by the formula:

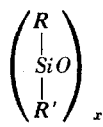

where R and R' are selected from the class consisting of methyl, ethyl, propyl, and butyl groups, halogen, and nitrile-substituted alkyl groups containing from 1- to 4-carbon atoms, phenyl, halogenated phenyl, vinyl, and cyclohexenyl groups and $x$ is a number greater than 100. It is preferred that the polymer have up to 0.35 percent and more preferably from about 0.1 to 0.2 mole percent vinyl containing groups.

In addition, the organopolysiloxanes may include antistructuring agents, such as hydroxyl-terminated organopolysiloxanes having viscosities between about 40 and 100 centistokes and more preferably between 50 and 75 centistokes. Examples of suitable antistructuring agents are hydroxyl-terminated dimethylpolysiloxanes, diphenylsilane diols, organic phosphate fluids, such as tributylphosphate, tricresylphosphate; water, dibutylphthalate and the like.

The amount of antistructuring agent employed is dependent upon the viscosity of the organopolysiloxane polymer, i.e., the higher the viscosity of the organopolysiloxane polymer, the greater the amount of antistructuring agent necessary in order to obtain a flowable composition. Generally, the amount will range from about 2 to 10 percent, preferably from about 3 to 5 percent, by weight based on the weight of the organopolysiloxane polymer.

In addition to the above two components, the flowable composition may contain sufficient reinforcing fillers to form a pasty mass having a penetrometer value of between 250 and 350. Of course, the amount of filler is dependent on the viscosity of the organopolysiloxane polymer and/or the mixture of organopolysiloxane polymer and antistructuring agent. Thus, the amount of filler employed may obviously be varied within wide limits; for instance, from about 10 to 100 percent by weight of filler based on the weight of the organopolysiloxane polymer. The exact amount of filler used will depend upon such factors as the viscosity of the polysiloxane polymer and the type of filler used (e.g., density of the filler). Obviously, reinforcing fillers, as well as nonreinforcing fillers, may be used with a major proportion being reinforcing fillers.

Examples of fillers which may be incorporated in the compositions of this invention are asbestos, clay, hydrated calcium silicate, zinc sulfide, silica aerogel, barium titanate, glass fiber, floc, iron oxide, bentonite, zinc oxide, titanium dioxide, magnesium, micronized graphite, micronized slate, micronized mica, celite, $PbO_2$, PbO blue lead, alumina, either hydrated or dehydrated, and calcium carbonate.

Low density closed or semi-closed cellular particles, such as glass spheres, expanded cellular perlite or expanded mica, plastic spheres, fused clay spheres, $SiO_2$ spheres, alumina spheres, or zirconium spheres, may be incorporated in the organopolysiloxane composition to reduce its density.

Various curing agents may be incorporated in the organopolysiloxane composition to effect a rapid conversion of the composition to an elastomeric state. Among such curing agents may be mentioned, for instance, benzoyl peroxide, t-butyl-perbenzoate, bis(2, 4-dichlorobenzoyl) peroxide, dicumyl peroxide, and dialkyl peroxides, such as di-t-butyl peroxide. These curing agents (or "vulcanization accerlerators" as they are often designated) may be present in amounts ranging from about 0.1 to as high as 4 to 8 percent or even more by weight based on the weight of the organopolysiloxane polymer.

While the above description has been limited primarily to compositions which cure to a solid elastomeric state, these compositions may be foamed in situ to form a cellular elastomeric material. The cellular material is formed by incorporating a blowing agent and/or a filler containing entrapped air in the flowable heat-curable composition and thereafter heating the composition to cause expansion of the entrapped gas or degradation of the blowing agent, resulting in the release of gas.

Examples of suitable blowing agents are ammonium carbonate, ammonium bicarbonate, N,N'-dimethyl-N,N'-dinitrosoterphthalamide, N,N'-dinitrosopentamethylene tetraamine, azodicarbonamide, and the like.

The manner in which the present composition may be prepared may be widely varied. For example, the composition may be mixed initially in a dough mixer followed by a milling step. It is preferred that the filler and the hydroxyl-terminated fluid be added to the organopolysiloxane polymer and where several fillers are used, it is preferred that the material be mixed after the addition of each filler to insure adequate dispersion and thorough wetting of the filler by the polymer. The curing agent may be added either during the final addition of the filler or after the addition of the filler is complete.

The organopolysiloxane composition thus prepared is added as a valley sealant and then vulcanized by heating at a temperature above about 110° C. for at least 3 minutes. If desired, the vulcanized material may be held in an oven at any desired temperature up to about 250° C. for several hours. Where it is desired to form a cellular silicone rubber, the flowable composition is heated to a temperature sufficient to cause expansion of entrapped gas or degradation of the blowing agent, generally from about 70° C. to 100° C. The resulting cellular composition is then vulcanized at a temperature of about 110° C. for at least 3 minutes. Additional curing may be employed by heating the vulcanized product in an oven at any desired temperature up to about 250° C. for several hours.

In some applications, it may be desirable to use an organopolysiloxane paste as a valley sealant. In these cases, the curing agent and vulcanization steps may be omitted.

The embodiments of this invention are further illustrated by the following examples in which all parts are by weight unless otherwise specified.

EXAMPLE 1

To a dough mixer containing about 200 parts of a methyl vinyl polymer having a viscosity of about 300,000 centistokes are added about four parts of CAB-O-SIL and six parts of hydroxyl-terminated dimethylpolysiloxane fluid having a viscosity of about 50 centistokes and mixed for about 15 minutes. To the resulting mixture is added about six parts of pyrogenic titanium dioxide and mixed for about 15 minutes. About 50 parts of MINUSIL is added to the resulting mixture and again mixed for about 30 minutes followed by the addition of eight parts of bis(2,4-dichlorobenzoyl) peroxide with mixing for an additional 15 minutes. The compounded material is removed from the dough mixer and bin aged for about 48 hours and then rolled on a three-roll mill. After storing the product for 24 hours, it exhibits a penetrometer reading of between 280 and 300 (expressed in units of tenths of millimeters) after 10 seconds at 25° C. as determined in accordance with ASTM D-217-65T.

The composition prepared above is added as a valley sealant during cabling. The cable is heated to about 110° C. for 30 minutes and then postcured at 205° C. for 4 hours.

EXAMPLE 2

To about 100 parts of the heat curable composition prepared in accordance with the procedure described in example 1 are mixed about three parts of bis(2,4-dichlorobenzoyl) peroxide and about five parts of ammonium carbonate. The composition is added as a valley sealant during cabling. The cable is heated to about 100° C. for 10 minutes and thereafter increased to about 130° C. for 10 minutes. The cable is then postcured for 4 hours at 205° C.

EXAMPLE 3

A paste composition prepared in accordance with the procedure described in example 1, except that bis(2, 4-dichlorobenzoyl) peroxide is omitted, is added during cabling. The paste composition is used in an unvulcanized condition as the valley sealant.

The organopolysiloxane compositions of this invention are easy to apply as valley sealants due to their flowable characteristics. They may be stored in an uncured condition for long periods of time and then cured by the application of heat in an elongated condition. These valley sealants minimize moisture wicking and are readily removed for splicing. In addition, these compositions may be foamed in situ to form low density valley sealants. Also, these compositions provide for extremely high insulation resistance when exposed to an open flame environment and revert to a nonconductive inert inorganic silica layer which will protect the circuit integrity even in the advent of a long duration open flame condition.

It should be understood that the foregoing description embodied in the present application is merely illustrate of the application of the invention and various modifications in the structural features in the described electrical cable incorporating a solid or cellular silicone rubber composition could be devised by those skilled in the art without departing from the invention.

I claim:

1. An electrical cable which will maintain its circuit integrity comprising a multiplicity of individual metallic conductors, a heat-cured silicone rubber valley sealant surrounding and intermediate to said metallic conductors, said valley sealant obtained from a heat-curable organopolysiloxane having up to 0.35 percent vinyl groups and further, containing sufficient filler antistructuring agent to provide a penetrometer value of between 250 and 350 and a protective covering surrounding said silicone rubber sealant.

2. The article of claim 1 wherein the valley sealant is a foamed silicone rubber.

3. The article of claim 1 wherein the silicone rubber contains from 1 percent to 50 percent by weight of low density cellular particulate matter.

4. The article of claim 3 wherein the particulate matter is hollow glass spheres.

5. The article of claim 1 wherein the heat-cured silicone rubber comprises a methyl vinyl polysiloxane polymer having a viscosity between 250,000 centistokes and 400,000 centistokes.

6. The article of claim 1 wherein the antistructuring agent is a hydroxyl-terminated dimethylpolysiloxane having a viscosity between 40 and 100 centistokes.

7. The composition of claim 1 wherein the metallic conductors contain a metallic strand, a sealant on said metallic strand, a silicone rubber on said strand sealant, a fibrous glass braid on said silicone rubber layer and a lacquer layer on said fibrous glass braid.